June 1, 1971    R. F. KLUG ET AL    3,581,388
METHOD OF ASSEMBLING A POTENTIOMETER
Original Filed Nov. 4, 1966    3 Sheets-Sheet 1
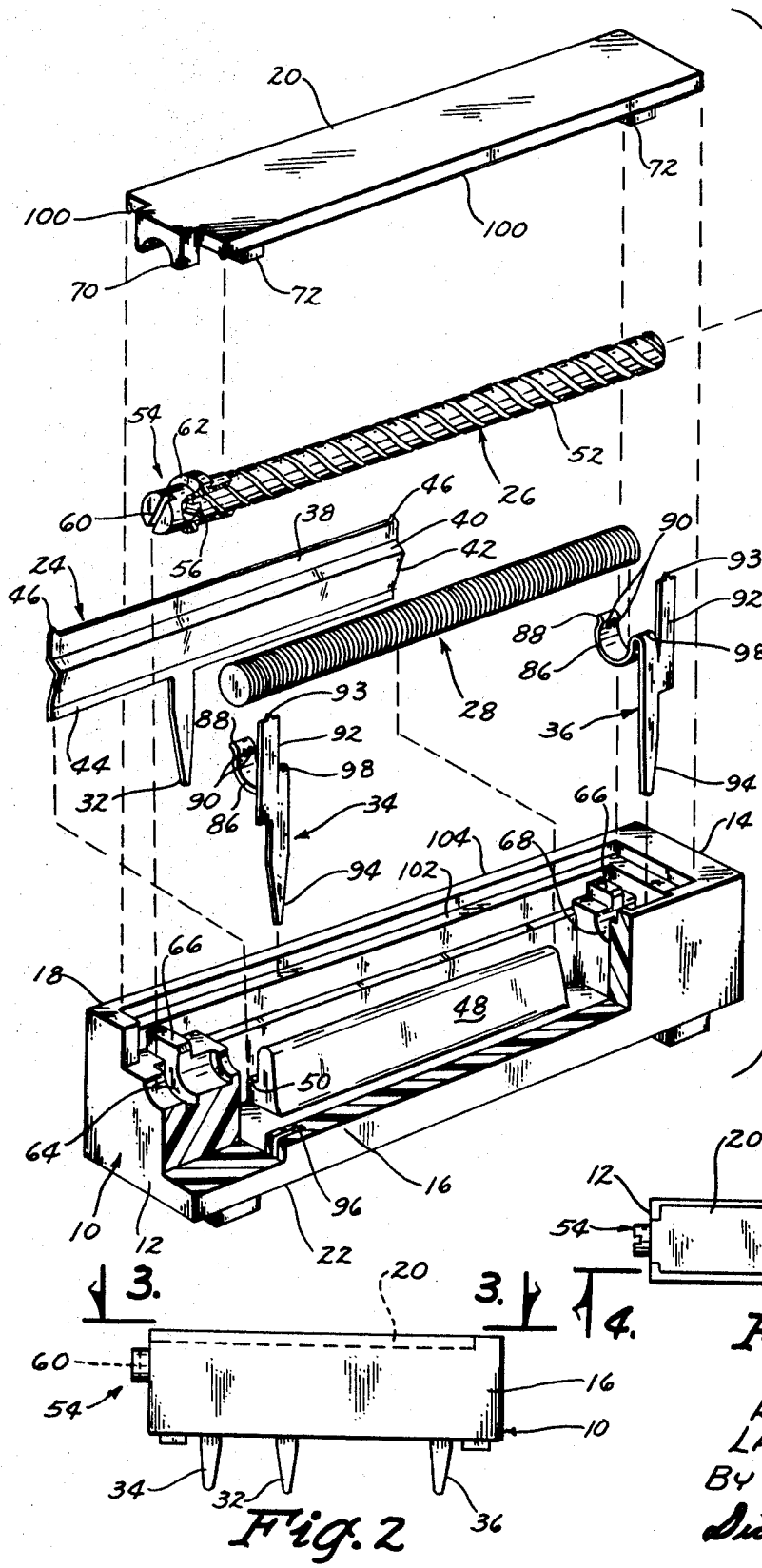
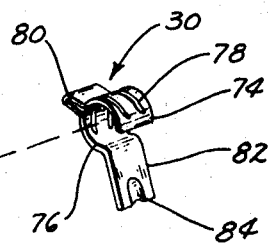
Fig. 1
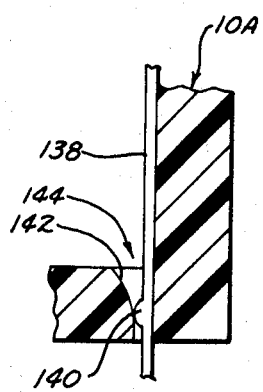
Fig. 16
Fig. 17
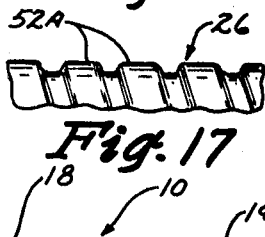
Fig. 3
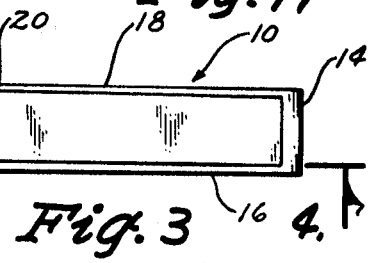
Fig. 2
INVENTORS
ROBERT F. KLUG
LARRY B. LINDQUIST
BY
ATTORNEYS

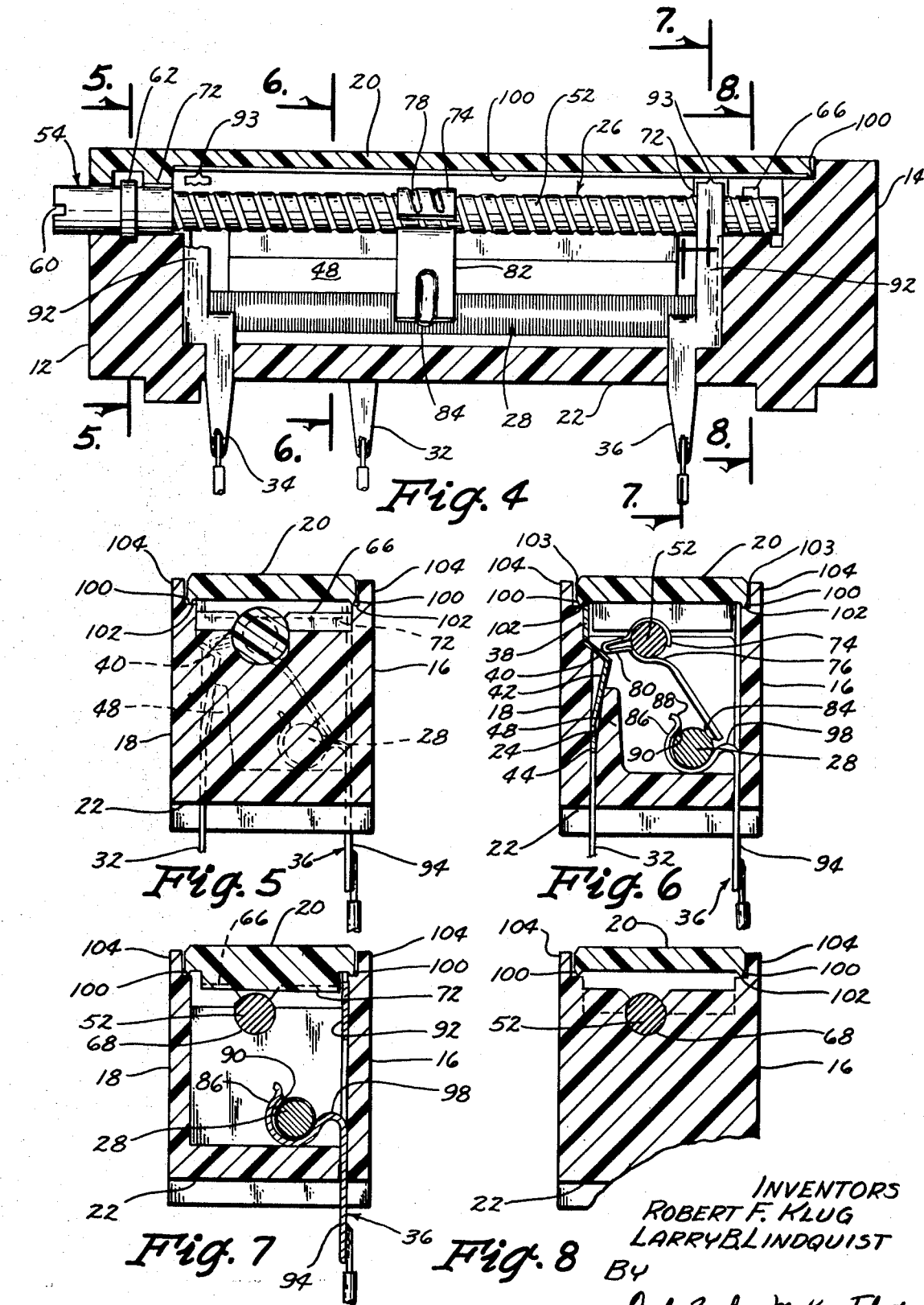

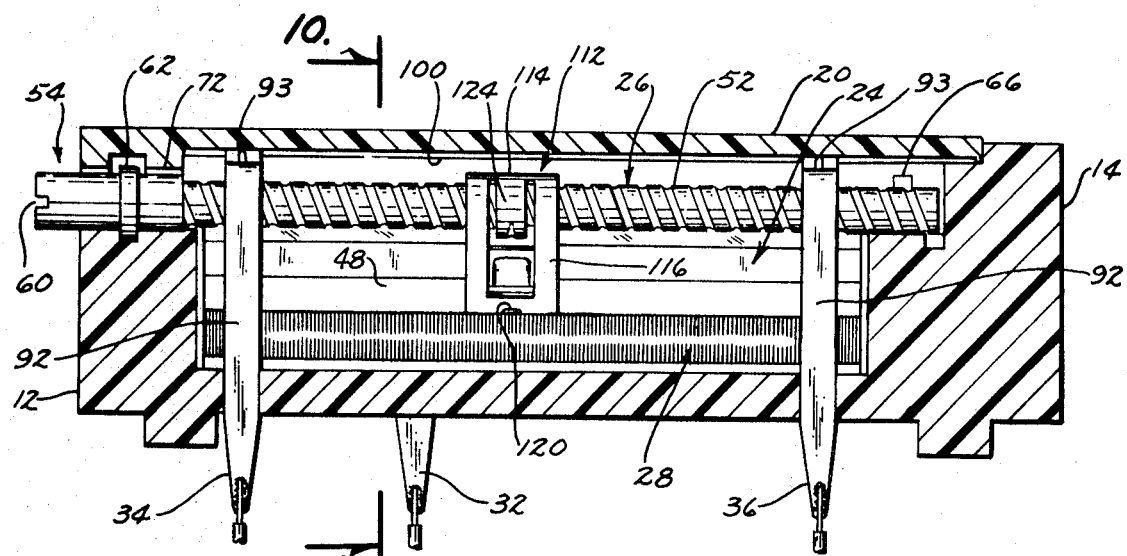
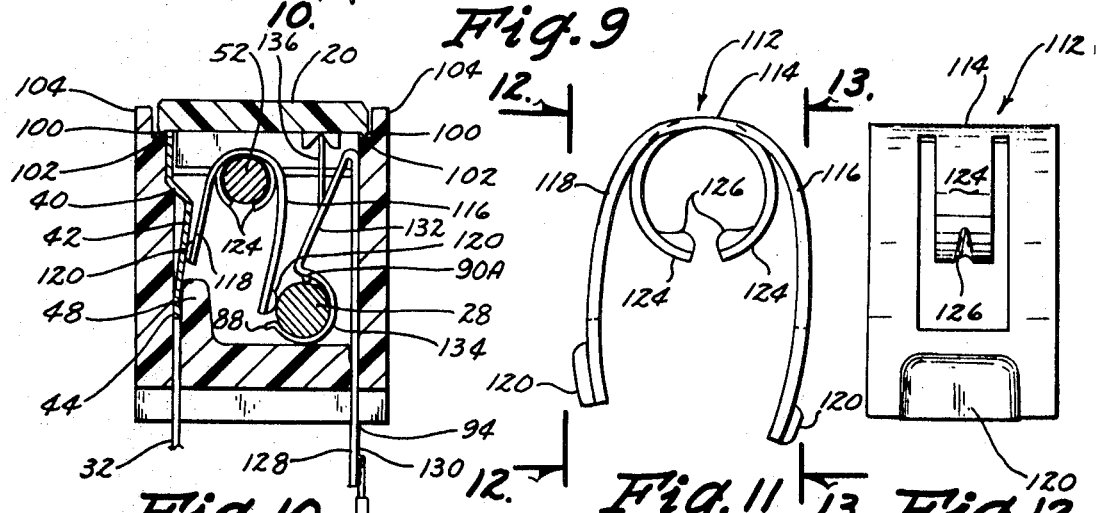
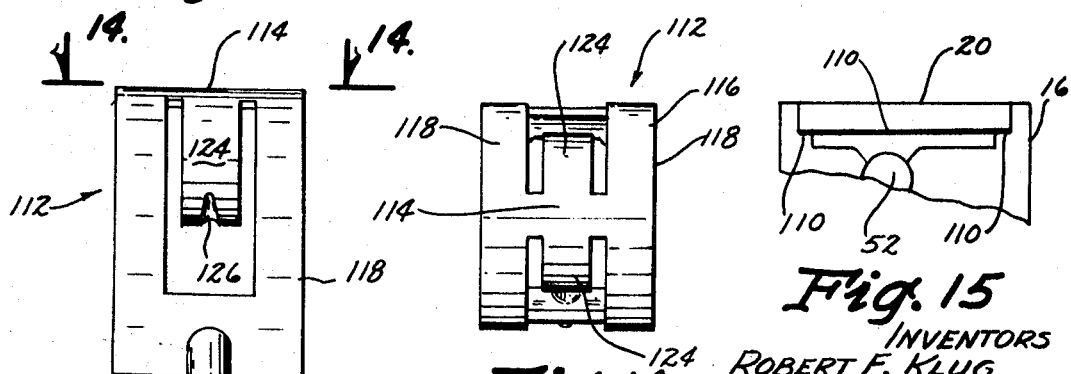

United States Patent Office 3,581,388
Patented June 1, 1971

3,581,388
METHOD OF ASSEMBLING A POTENTIOMETER
Robert F. Klug and Larry B. Lindquist, Columbus, Nebr., assignors to Dale Electronics, Inc., Columbus, Nebr.
Original application Nov. 4, 1966, Ser. No. 592,077, now Patent No. 3,476,120. Divided and this application Feb. 5, 1968, Ser. No. 703,040
Int. Cl. H01s 4/00
U.S. Cl. 29—592                                            3 Claims

ABSTRACT OF THE DISCLOSURE

The method of assembling a potentiometer having a resistance coil, a collector member and a wiper assembly by providing a housing having an opening in one side, placing a closure having a tapered rib adjacent its peripheral edge within said opening, applying pressure and ultrasonic vibrations to the closure and the housing to concentrate heat energy at the rib to melt the rib, and cooling of the resulting unit to effect the seal of the closure to the housing unit.

---

This application is a divisional application of co-pending application Ser. No. 592,077, filed Nov. 4, 1966.

This invention relates to a potentiometer and in particular to an improved miniaturized potentiometer.

The potentiometer of this invention involves a housing having a closure cover plate and a resistance coil, leadscrew and collector member extending the length of the housing. A wiper arm is carried upon said leadscrew and extends between the resistance coil and the collector member. Integral terminals for the resistance coil are provided which extend through the housing and are in supporting engagement with the resistance coil at its opposite ends. The collector member is positioned along one side wall of the housing and is yieldably held in position by an upstanding wall in the housing and the cover or closure member.

The closure member is provided with ribs along its peripheral edges for engagement with the top edges of the housing and upon a limited amount of heat and pressure being applied to the housing and closure member the rib is melted to form a seal in the joint between the closure member and the housing and simultaneously as the closure member is moved into mating engagement with the housing pointed projections on the collector member and terminal plates connected to the resistance coil are imbedded in the closure member and are forced into a press-fit engagement with the wall opposite the closure member. The terminal plates may extend through an opening in the wall opposite the closure member wherein the openings for the terminal plates are such a size that they restrict the movement of the terminal plates therethrough. The ribs along the edges of the closure wall require substantially less heat to melt the material in the ribs than would be required to melt the relatively wider edges of the closure wall and thus the sealing operation takes place in a shorter time with less temperature and heat. An adhesive may be used in the joint sealing the housing; however, the resin in the plastic material of the housing enclosure member will normally be sufficient.

The lead screw includes a metal portion and a nylon head portion which is connected to the leadscrew by a rib and groove molded connection. The leadscrew is provided with threads of such a design that neither the wiper assembly or the threads of the lead screw will be damaged upon the leadscrew being turned beyond the amount required for movement the wiper assembly between the normal limits of movement within the housing. Thus slipping between the wiper member and the leadscrew will occur but will not cause damage to either component.

The resistance coil is positioned in the housing on spring portions of a pair of terminal plates. The wiper assembly is provided with a spring arm for engaging the resistance coil. Thus, the collector member and the terminal members for the resistance coil make it possible to employ various resistance coils without redesigning these particular parts. The wiper assembly having its novel configuration also makes it possible to vary the diameter of the resistance coil and the provide great versatility for assembling the potentiometer.

It has been found that in heating the housing and the closure member that the ribs on the closure wall serve as energy directors and are particularly responsive to the application of an ultrasonic plastic welder. A slip fit is povided between the closure wall and the housing when initially assembled such that the melted plastic material and the rib will flow into the space between the closure wall and the housing and thus form the seal therebetween. The application of heat and pressure to the closure wall and housing result in the seal therebetween being formed but also the locking in position of the collector member and terminal plates.

A further object of the device of this invention is to provide snap-in retaining means in one of the housing portions to releasably receive the ends of the leadscrew to retain and journal the leadscrew.

The preceding brief description of this invention makes it apparent that the object of this invention is to provide improvements in leadscrew adjusted miniaturized potentiometers. The advantages discussed will thus be apparent to those skilled in the art. Our invention consists in the construction, arrangements, and combination, of the various parts of the device, whereby the advantages contemplated are attained as hereinafter more fully set forth, specifically pointed out in our claims, and illustrated in the accompanying drawings, in which:

FIG. 1 is an exploded fragmentary perspective view of the miniaturized potentiometer drawn to an enlarged scale;

FIG. 2 is a side elevation view of the potentiometer of FIG. 1 drawn to a reduced scale;

FIG. 3 is a top plan view taken along line 3—3 in FIG. 2;

FIG. 4 is a longitudinal cross-sectional elevation view of the potentiometer taken along line 4—4 in FIG. 3;

FIG. 5 is a cross-sectional view taken along line 5—5 in FIG. 4;

FIG. 6 is a cross-sectional view taken along line 6—6 in FIG. 4;

FIG. 7 is a cross-sectional view taken along line 7—7 in FIG. 4;

FIG. 8 is a cross-sectional view taken along line 8—8 in FIG. 4;

FIG. 9 is a longitudinal cross-sectional elevational view of an alternate design of a miniaturized potentiometer;

FIG. 10 is a cross-sectional view taken along line 10—10 in FIG. 9;

FIG. 11 is a side elevation view of the wiper assembly only;

FIG. 12 is an end elevation view taken along line 12—12 in FIG. 11;

FIG. 13 is an end elevation view taken along line 13—13 in FIG. 11;

FIG. 14 is a top plan view taken along line 14—14 in FIG. 13;

FIG. 15 is a fragmentary cross-sectional view of the housing in its sealed closed condition;

FIG. 16 is a partial sectional view of an alternate housing showing an alternate terminal clip construction; and FIG. 17 is a partial elevation at an enlarged scale of the leadscrew showing the details of the threads thereon.

The potentiometer of this invention includes a housing unit 10 having end walls 12 and 14, side walls 16 and 18 and a top closure wall 20 disposed opposite a bottom wall 22. Inside the housing, a collector member 24 is provided along with a lead screw 26 and a resistance coil 28. A wiper assembly 30 is threadably mounted on the lead screw 26 for engagement with the collector member 24 and the resistance coil 28. An electrical terminal 32 for the collector member 24 and a pair of terminal members 34 and 36 at opposite ends of the resistance coil 28 extend through the bottom wall 22 of the housing 10.

The collector bar 24 is of spring material and includes an upper vertically disposed flat portion 38 integrally connected to a transversely inwardly and downwardly extending portion 40 which in turn merges into a transversely outwardly and downwardly extending portion 42. Lastly, a downwardly and vertically extending portion 44 is integrally connected to the portion 42. A pair of upwardly extending V-shaped projections 46 are provided at opposite ends of the portion 38 for engagement with the closure wall 20. The terminal portion 32 extends downwardly from the portion 44 along the lower side of the collector member 24. The terminal portion 32 is tapered along its substantial length. The collector member 24 is disposed in the housing unit 10 along the inside surface of the side wall 18 and against a retainer wall 48 having a horizontal shoulder 50 on which the bottom portion 44 of the collector member 24 rests. The retainer wall 48 is seen in FIGS. 5 and 6 for example to have a tapered surface facing the collector member 24 and the wall terminates in the middle area of the portion 42. It is seen that the space between the housing wall 18 and the retainer wall 48 is sufficient to stabilize the collector member and thus effectively hold it in place. An opening is provided in the bottom wall 22 to receive the terminal portion 32 and the opening is of such a size that the terminal is press-fitted into the opening.

The leadscrew 26 has a metal threaded portion 52 with a head portion 54 of nylon material molded thereon. A rib and groove connection is provided between the head 54 and the leadscrew shaft 52. A groove 56 is diametrically formed in the end of the leadscrew shaft 52 and a rib is provided in the head 54 for mating engagement with the groove. The lead 54 is preferably molded onto the shaft 52 and the groove 56 prevents rotation by the head 54 on the shaft 52. A diametrically located slot 60 is provided in the outer end of the head 54 for receiving a screw driver in rotatably adjusting the leadscrew. An annular shoulder 62 formed on the head 54 is positioned in a semi-cylindrical recess 64 adjacent a shoulder 66 in the housing unit 10 adjacent the end wall 12. Thus the leadscrew is permitted to rotate in place without any relative longitudinal movement.

The opposite end of the leadscrew is received in a semi-cylindrical recess 68. The detailed construction of recesses 68 are best shown in FIGS. 6 and 15. The recesses 68 are substantially circular in cross-sectional shape, but are open at their upper portions as defined by tapered projections 68A. The lateral distance between the inner points of projections 68A is less than the diameter of the circular recesses 68, and is also less than the diameter of shaft 52. As a consequence, the shaft 52 can be forcibly "snapped" in to the recess 68 as the slightly resilient projections 68A are momentarily deformed, whereupon the ends of shaft 52 are rotatably journaled in the recesses 68. The cover all 20 is provided with mating openings 70 and 72 at its opposite ends for receiving the leadscrew head 54 and the opposite end of the shaft 52 as is seen for example in FIG. 1.

The wiper assembly 30 mounted on the leadscrew 26 includes a pair of vertically spaced apart arcuate shaped portions 74 and 76 with threads 78 and an integral U-shaped portion 80 extending transversely of the leadscrew for engaging the collector member along the portion 40 (FIGS. 5 and 6). Electrical contact is made between the wiper member 30 and the resistance coil 28 through a portion 82 extending transversely outwardly and downwardly from the arcuate portion 76. A protuberance 84 is provided on the end of the portion 82 for enhancing the electrical contact with the resistance coil 28. Should the leadscrew 26 be adjusted to an extent that the wiper assembly would engage the inner ends of the housing 10, the wiper assembly and leadscrew are protected against damage from further rotation of the leadscrew. This is accomplished by the springing apart of portions 74 and 76 as threads 78 on the wiper assembly ride over the arcuate threads (FIG. 17) 52A of leadscrew 26.

It is seen in FIG. 6, for example, that the leadscrew 52 is disposed in the housing unit 10 above the resistance coil 28 and between the resistance coil and collector member 24.

The wiper member 30 is limited against rotational movement by its portion 80 engaging the portion 40 of the collector member and the protuberance 84 on arm portion 82 engaging the resistance coil 28.

As also seen in FIG. 6, for example, the resistance coil 28 is held against rotation and is yieldably supported by semi-circular portions 86 extending transversely inwardly from the terminal members 34 and 36. The portions 86 terminate in outwardly flared ends 88. Protuberances 90 are formed on the inside surface of the semi-circular portion 86 for locking engagement with the resistance coil 28.

The terminal members 34 are also provided with upstanding flat portions 92 having V-shaped pointed projections 93 on their upper ends for engagement with the cover plate 20. In FIG. 7 it is seen that the upstanding portion 92 is positioned flat against the inside surface of the housing wall 16. In the same plane with the portion 92 is a downwardly extending V-shaped tapered terminal portion 94 which extends through a slot 96 formed in the housing (FIG. 1) and having a width the same as the width of the terminal portion 94 so that it is press-fitted into the opening or slot 96.

The cover plate 20 is provided on its inner surface with V-shaped downwardly extending ribs 100 adjacent its end and side edges for engagement with longitudinally extending shoulder 102 formed inwardly in the top portions of the housing walls. Upstanding side wall portions 104 extend along the outer longitudinal edges of the cover all 20. When the housing is initially assembled the projections 93 on the terminal members 34 and 36 and the pro-projections 46 on the collector member 24 also engage the bottom side of the cover plate 20. At this point, the terminal portions 32 and 94 are nested in their respective openings in the housing 10. Then, preferably heat is applied in the area of the ribs 100 thus melting them and filling the space 103. Heat is preferably applied through ultrasonic welding wherein ultrasonic vibrations are imposed on the housing while pressure is exerted on the housing to force the cover plate 20 downwardly on the top edges of the housing side and end walls. It is also seen that the cover plate 20 is pressed into the housing 10 as the ribs 100 melt and may slightly fill the space 103. The bond line is best defined in the area of rib 100. The V-shaped rib 100 directs the energy to the point of the rib and the point of the rib is the point of greatest heat concentration as the ultrasonic vibrations are imposed on the housing. This movement and the softening of the cover plate 20 permits the projections 46 and 93 to become imbedded in the plate 20. The pressure of the plate 20 against the projections also press-fits the terminal portions 32 and 94 into their respective openings. Upon the cooling and hardening of the joint between the cover plate 20 and the housing unit 10, the components therein are fixed in place by the cover plate 20 since the projections 46 and 93 are locked to the cover plate. In FIG. 15 a bead 110 of plastic material from the ribs 100 is shown filling the clearance space 102 between the cover plate 20 and the housing side walls 16 and 18.

FIGS. 9 through 14 illustrate an alternate embodiment of this invention wherein all components but the wiper member are similar to those herein above described. The wiper assembly is referred to generally by the reference numeral 112 and is seen to be U-shaped with a bight portion 114 having a pair of leg portions 116 and 118. The bottom ends of each of the leg portions 116 and 118 are provided with protuberances 120 which engage the portion 42 of the collector plate member 24 and the resistance coil 28 respectively.

A pair of clamping fingers 124 semi-circular in shape are deformed out of the leg portions 116 and 118 to extend around the leadscrew portion 52. Inwardly extending protuberances 126 are provided for engaging the threads of the leadscrew portion 52. It is thus seen from FIG. 10 for example that the legs 116 and 118 are spring biased into engagement with the collector member 42 and the resistance coil 28 and accordingly will maintain contact throughout movement along the entire length of the leadscrew 26.

An alternate clip 128 is used in conjunction with the wiper assembly 112 of FIG. 10, and is comprised of a vertical leg 130 which is tapered at its lower end as are the lower portions 94 of clips 34 and 36. The upper portion of leg 130 is then bent back upon itself to form arm 132 which extends downwardly and inwardly to terminate in an arcuate portion 134 with a lip 88 and protuberances 90A similar to the lip 88 and protuberances 90, respectively, on clips 34 and 36. A tab 136 with a pointed upper end is cut out of arm 132 and is bent upwardly to forcibly engage the upper housing cover 20 in the same manner that portions 92 and 93 on clips 34 and 36 performed this function.

An alternate terminal construction is shown in FIG. 16 which is a typical view of the terminal end of a clip or collector bar as it projects through a suitable opening in a housing 10A. A leg 138 of a clip or terminal means is tapered similarly to portion 94 of clip 34, and a protuberance 140 forcibly engages at least one arcuate wall 142 of the opening 144 in the housing. Protuberance 140 serves to stabilize the leg 138 within the opening.

The device thus described can be easily assembled, for the collector bar 24, the clips 34 and 36, the resistor coil 28 and leadscrew 26 are easily positioned and mounted in the manner described within the housing 10. This efficient "drop in" means of assembly is subsequently finalized by ultrasonically welding the cover 20 to the housing 10 to stabilize the components and to seal the top of the housing. Suitable sealing agents can be used around the terminal tabs of the clips 34 and 36, and the collector bar 24 at the points where these terminals project from the housing. The leadscrew is insulated from the operator by the nylon leadscrew head 54, and the wiper assembly is protected against overtravel by the unique ratcheting action of the wiper assembly 30 as the portions 74 and 76 thereof slide over the arcuate threads of the leadscrew when the end walls of the housing are encountered.

Thus, from the foregoing, it is seen that the device of this invention will accomplish at least all of its stated objectives.

Some changes may be made in the construction and arrangement of our method of assembling a potentiometer without departing from the real spirit and purpose of our invention, and it is our intention to cover by our claims, any modified forms of structure or use of mechanical equivalents which may be reasonably included within their scope.

We claim:

1. The method of sealing a potentiometer having a resistance coil, collector member and wiper assembly, comprising the steps of providing a housing having an opening in one side defined by the outer edge of the housing side walls, assembling a terminal plate and resistance means in said housing opening, said terminal plate having pointed anchoring ends extending therefrom, placing a closure wall having a tapered rib adjacent its peripheral edge over said opening with said rib engaging said outer edge of said housing side walls and with said closure wall engaging said pointed anchoring ends, applying pressure and ultrasonic vibrations to said closure wall and said housing to concentrate heat energy at said rib to melt said rib and move said closure wall towards said housing thereby causing said melted rib material to flow between said closure wall and the housing peripheral edge while contemporaneously embedding and anchoring the pointed anchoring ends in said closure wall whereby said terminal plate is locked in place and limited against movement in said housing, and cooling said melted rib material.

2. The method of claim 1 wherein the terminal plate has portions which are received in second openings in the housing wall opposite said closure wall and said pressure and vibrations step includes forcing said portions further into the said second openings.

3. The method of claim 2 wherein said collector member extends between said closure wall and said housing wall opposite said closure wall and has a pointed projection engaging said closure wall, said method comprising securing said resistance coil at one end to said terminal plate; securing a second terminal plate to the other end of said coil so that it extends between said closure wall and said housing wall opposite said closure wall, said second plate having a pointed projecting engaging said closure wall; and said pressure and vibration step including, embedding all of said pointed projections in said closure wall.

References Cited

UNITED STATES PATENTS

| 2,805,307 | 9/1957 | Bourns et al. | 338—183X |
| 3,238,488 | 3/1966 | Langenbach et al. | 338—183X |
| 3,164,861 | 1/1965 | Munroe et al. | 18—5 |
| 3,224,916 | 12/1963 | Soloff et al. | 156—73 |
| 3,433,413 | 3/1969 | Berleyoung et al. | 156—73X |
| 3,436,006 | 4/1969 | Cole | 264—23 |

CHARLIE T. MOON, Primary Examiner

R. W. CHURCH, Assistant Examiner

U.S. Cl. X.R.

29—432, 630; 156—73; 264—23; 338—183; 29—626, 627